United States Patent
Oettinger

[11] 3,982,818
[45] Sept. 28, 1976

[54] OPTICAL DEVICE WITH LIQUID COATING
[75] Inventor: Peter E. Oettinger, Acton, Mass.
[73] Assignee: Thermo Electron Corporation, Waltham, Mass.
[22] Filed: Dec. 30, 1974
[21] Appl. No.: 537,483

[52] U.S. Cl. .............................. 350/157; 350/147
[51] Int. Cl.² .......................................... G02B 1/02
[58] Field of Search ........... 350/157, 147, 165, 164; 331/94.5, 94.5 R, 94.5 T; 353/53, 52, 54

[56] References Cited
UNITED STATES PATENTS

| | | | |
|---|---|---|---|
| 3,153,204 | 8/1962 | Dunsmuir | 331/94.5 |
| 3,552,823 | 1/1971 | Badoz et al. | 350/157 |
| 3,687,521 | 12/1970 | Kusters | 350/157 |
| 3,696,038 | 9/1970 | Davies et al. | 350/157 |

FOREIGN PATENTS OR APPLICATIONS

| | | | |
|---|---|---|---|
| 1,018,294 | 1/1966 | United Kingdom | 331/94.5 |

Primary Examiner—John K. Corbin
Assistant Examiner—B. Wm. delos Reyes
Attorney, Agent, or Firm—Kenway & Jenney

[57] ABSTRACT

An optical device for use with laser systems comprising a crystal having a liquid coating. The material comprising the liquid coating is characterized by an index of refraction which is closer to at least one principal index of refraction of the crystal than the index of refraction of the medium exterior to the crystal is to any principal index of refraction of the crystal.

10 Claims, 4 Drawing Figures

OPTICAL DEVICE WITH LIQUID COATING

BACKGROUND OF THE INVENTION

This invention relates generally to optical systems and more particularly to devices used for the transmission of laser radiation therethrough.

It is generally known that the application of laser radiation to crystals beyond certain energy thresholds result in both surface damage on the radiation entrance and/or exit faces of the crystals and bulk damage within the interior of the crystal. In transparent dielectrics, surface damage is due to electron avalanche processes, induced by localized electric fields which occur in response to nanosecond incident laser pulses having a power density above a characteristic threshold, and in response to picosecond incident laser pulses having an energy density above a characteristic threshold. For dielectrics which are self-absorbing, or which contain impurity inclusions that can absorb incident radiation, the above-noted surface and bulk damage is compounded by heating of the crystal structure. Primary causes of the induced surface damage are surface structural defects (such as microscopic grooves created by polishing materials) which produce localized intensifications of the electric field leading to avalanche breakdown. Generally, when no voids or impurity inclusions exist in the bulk of a non-absorbing material, radiation damage thresholds on solid surfaces are lower than those within the bulk material. Thus, for most materials, the surface damage threshold provides the limit to the power or energy density of a beam which may be applied to a crystal.

To overcome surface damage to a significant degree, the entrance and exit faces of certain crystalline materials may be highly polished so that the dimensions of any grooves or inclusions are 100 Angstroms or less, thereby raising the surface damage thresholds to those for the bulk material and consequently, permitting higher energy incident radiation. This approach to the surface damage problem has been experimentally confirmed using ultra-fine polishing techniques, e.g., ion-beam or bowl-feed methods. See D. W. Fradin and M. Bass, Applied Physics Letters, 22, 157 (1973). However, laser-induced surface damage is especially severe in a number of non-linear crystalline materials such as proustite ($Ag_3AsS_3$) and cinnabar (HgS), which are relatively soft and correspondingly difficult and expensive to polish to an ultra-fine degree.

These uniaxial crystalline materials may be characterized by two different principal indices of refraction, the ordinary index of refraction, $n_o$, and the extraordinary index of refraction, $n_e$. Such crystals, which are sufficiently non-linear and birefringent (e.g. proustite), may be used to produce an output light signal having a frequency equal to the difference between the frequencies associated with two incident linearly and orthogonally polarized light signals. See, for example, F. Zernike and J. E. Midwinter, *Applied Non-linear Optics*, John Wiley, New York 1973. In that application, the first input beam is controlled to have a polarization perpendicular to the plane formed by the crystal's optical axis and the direction of beam propagation. This beam is known as the "ordinary ray" within the interior of the crystal and is subject to the ordinary index of refraction, $n_o$. The ordinary index of refraction is invariant with the angular orientation of the propagation vector of the incident light beam relative to the crystal optical axis.

The second input beam is controlled to have a polarization in the plane formed by the crystal's optical axis and the direction of beam propagation. This latter beam is known as the "extraordinary ray" and is subject to the extraordinary index of refraction. The extraordinary index of refraction is a function of the angular orientation of the propagation vector of the incident light beam with respect to the crystal's optical axis.

In order to maximize the energy transfer from two incident linearly and orthogonally polarized light beams of differing frequency to the resultant difference frequency light beam generated therein, the crystal's optical axis must be oriented relative to the incident beams so that the input and output beams are phase matched and that constructive interference occurs in the crystal interior region (see Zernike and Midwinter, cited above, Chapters 2 and 3). Accordingly, in order to generate a substantial intensity beam at a specific infrared wavelength, for example, two appropriately separated (in frequency) linearly and orthogonally polarized light beams may be applied to a sufficiently non-linear and birefringent crystal at the specific orientation relative to the crystal optical axis required for phase matching. The required orientation may be determined from the wavelength dispersion characteristic for the crystal in accordance with cited Zernike and Midwinter reference.

The intensity of the resultant difference frequency beam is directly dependent upon and limited by the intensity of incident beams which are applied to the crystal. Although known ultra-fine polishing techniques are effective to raise the surface damage thresholds to those of bulk material for some of the non-linear materials, the costs associated with such techniques set severe practical limitations to their use in the production of laser devices for laser systems.

Another known technique to minimize the surface damage problem in non-linear laser materials is to apply a solid coating to the surface of the crystal wherein the solid coating has an index of refraction substantially matched to the crystal. In order for this technique to be effective, the solid coating must smooth out the imperfections in the crystal surfaces by filling in the pits or grooves in order to provide a reduction in the induced local electric fields. However, experimental results indicate that a thin coating, either vapor-deposited or sputtered on a crystal surface, tends to assume the shape of the surface, thereby retaining its defects and in some cases emphasizing their effects. However, if the thin film is more damage resistant than the crystal material, the surface damage is somewhat reduced, and an effective rise in the surface damage threshold may be attained. In fact, sapphire coatings on $LiNbO_3$ have been observed to raise surface damage thresholds by a factor of approximately 2.5, but even with this improvement, the surface damage threshold is still substantially below bulk damage thresholds.

Alternatively, instead of the thin film, polished flats can be optically contacted to the faces of the crystal, for example, by bonding fused-silica to $LiNbO_3$ with the result that an approximate four-fold increase in the damage threshold is observed for radiation at 1.06 m. See W. D. Fountain, L. M. Osterink and G. A. Massey, ASTM-NBC Symposium on Laser Damage in Materials: 1971, A. J. Glass and A. H. Guenther, Editors, NBC Spec. Publ. 356 (1971).

Thus, although these index of refraction matching solid coatings do provide increases on the surface damage thresholds to a measurable degree, none of the approaches have been successful in raising that threshold to the level observed for the bulk material.

It is an object of this invention to provide optical devices wherein the surface damage threshold is substantially the same as the damage threshold for the bulk of the crystal.

It is the further object of this invention to provide devices for transmission of high power laser radiation therethrough.

Other and more specific objects of the invention will become apparent from the description and figures which follow.

SUMMARY OF THE INVENTION

According to the present invention, a crystalline material is provided with a liquid coating wherein the index of refraction of the liquid coating is closer to at least one principal index of refraction of the crystal than the index of refraction of the medium exterior to the crystal is to any principal index of refraction. That is, the magnitude of the difference between the index of refraction of the liquid coating and at least one principal index of refraction of the crystal is less than the magnitude of the difference between the index of refraction of the medium exterior to the crystal and any principal index of refraction of the crystal. Preferably, the index of refraction of the liquid coating substantially matches a principal index of refraction of the crystal.

For a better understanding of the present invention, together with other and further features and advantages of the invention, reference should be made to the following detailed description of preferred embodiments which should be read in connection with the appended drawings in which.

DESCRIPTION OF THE PREFERRED EMBODIMENT

Figure 1:
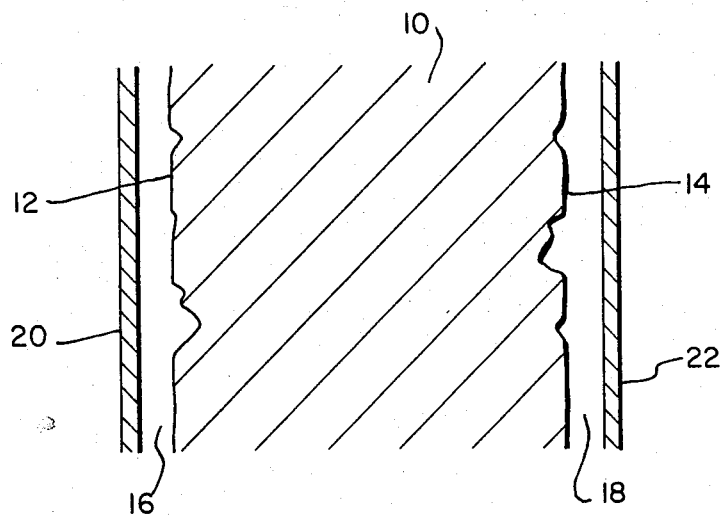
FIG. 1 shows a cross-section of a crystal embodying the invention.

FIG. 1 shows a cross section of a crystal having a liquid coating on its entrance and exit faces in accordance with the present invention. In that figure, the crystal 10 has irregularities on its entrance face 12 and exit face 14. A liquid coating on the faces of crystal 10 are indicated by the regions 16 and 18. In this embodiment, the liquid is maintained in contact with the crystal 10 by the optical flats 20 and 22. It will be understood that flats 20 and 22 are composed of a material which is readily polished to a relatively smooth surface, while on the other hand, the crystal 10 is a material which has relatively rough surfaces, either from polishing grooves, or due to the fact that the crystal material is either difficult or economically impractical to produce with an ultra-finely polished surface. In other embodiments, the crystal may be in a non-vertical orientation. In an embodiment having a horizontal orientation, the crystal may have a liquid coating on the top surface only and having no optical flat equivalent to flat 20. In any of such embodiments, the crystal may have a liquid coating adjacent to only one face thereof, with the liquid being held in place by an optical flat equivalent to flat 20.

Figure 2:
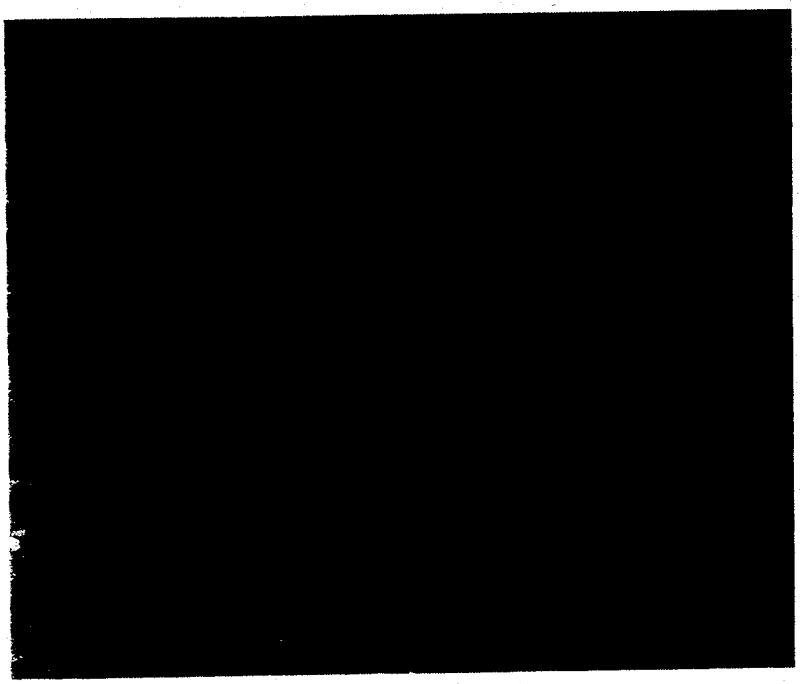
FIG. 2 is a photomicrograph of ruby laser-induced surface damage on an uncoated proustite crystal.

In order to quantitatively evaluate the effects of the liquid coatings on the entrance face of a crystal, an uncoated proustite ($Ag_3AsS_3$) crystal in an air medium was subjected to radiation applied from a multi-mode (Q-switched, 50 nanosecond pulse width) ruby laser. Crystalline proustite is negative uniaxial and has a birefringence, $n_o-n_e$, approximately equal to 0.2, with an averaged index of refraction, $n_p = (n_e+n_o/2)$, approximately equal to 2.75 at the ruby laser wavelength (6943 Angstroms). The laser was pulsed once each three seconds to provide peak power approximating the 3 $MW/cm^2$ surface damage threshold of uncoated proustite. A record was maintained of the number of shots required to observe a plasma spark, indicative of a predetermined degree of surface damage on the proustite. FIG. 2 is a photomicrograph of the entrance face of the uncoated proustite crystal after being pulsed with an intensity of 12 $MW/cm^2$. In this figure, the polishing grooves are clearly evident, as is the surface damage which is in the form of pits proliferating along the grooves. Since proustite has its absorption edge near 0.6 m, and thus absorbs ruby laser radiation to a significant degree, the entrance face was more readily damaged than the exit face.

Following the irradiation of the uncoated proustite crystal, the entrance face of the crystal was sequentially provided with a thin coating (approximately 1 mm) of highly transmitting water (index of refraction, $n=1.33$), glycerine ($n=1.47$), and carbon disulfide ($n=1.63$). It should be noted that the index of refraction of each of these liquids is closer to both principal indices of refraction of proustite (at ruby laser wavelengths) that the index of refraction of air (=1.0) is to either the ordinary or extraordinary index of refraction of proustite. For each liquid coating, the crystal was subjected to a similar series of ruby laser pulses.

Figure 3:
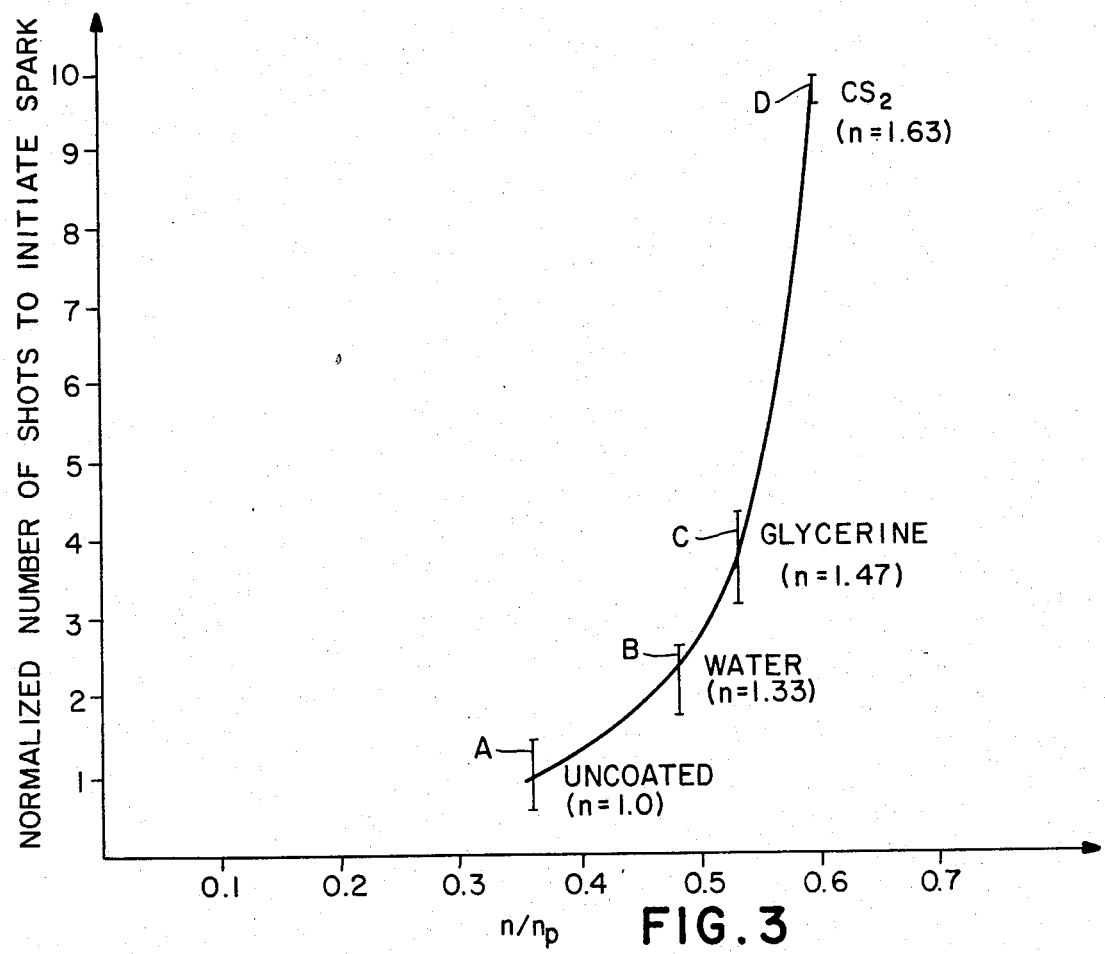
FIG. 3 shows the resistance to surface damage of a proustite crystal coated in accordance with the present invention as a function of the index of refraction of the liquid coating.

FIG. 3 shows the number of shots (normalized to the uncoated proustite) required to initiate a spark as a function of the ratio of the index of refraction for the various liquid coatings used to the averaged index of refraction of proustite ($n_p$=2.75). More particularly, the range of date points denoted A in FIG. 3 represents the number of shots required to initiate a spark in an uncoated proustite. The range of data points denoted B is representative of the number of shots required to initiate sparks (normalized to range A) when the proustite was coated with water. Similarly, ranges C and D, respectively, show the number of shots (normalized to range A) required to initiate sparks for glycerine and carbon disulfide coatings, respectively. It should be noted that the number of shots required (before surface damage was detected) increased as the index of refraction of the coating more nearly matched an index of the proustite crystal, thereby indicating that the surface damage threshold increases with the degree of index of refraction matching of the liquid coating to the crystal.

Figure 4:
FIG. 4 is a photomicrograph of ruby laser-induced bulk damage in a proustite crystal coated in accordance with the present invention.

In addition to the water, glycerine, and carbon disulfide coatings which absorbed only a small percent of the ruby radiation, experiments were conducted using a thin layer coating (approximately 1 mm) of a liquid, high index of refraction arsenic compound ($n=2.11$) which transmitted only approximately 50 percent of the incident beam. The specific arsenic compound was Standard Group, Series EH-2.11, manufactured by R. P. Cargille Laboratories, Cedar Grove, New Jersey. Using this coating, no surface damage was observed on the proustite crystal, at incident intensities twice those previously used with the other liquid coatings, for a total of 300 shots (10 times more than the carbon disulfide coating withstood). Gradual increases in the ruby laser intensity (with ten pulses fired at the coated proustite crystal for each level of energy) resulted in observable damage on the proustite at approximately 75 MW/cm². This represents a 25 fold increase over that observed for the uncoated crystal. Furthermore, the damage pattern, shown in FIG. 4, was a different mode of damage than could be attributed to polishing imperfections, and indicates bulk damage erupting from just below the surface. Accordingly, for this liquid arsenic compound, the index of refraction matching with the proustite crystal was achieved to a sufficient degree so that the surface damage threshold was raised at least to the bulk damage threshold.

In addition to the uniaxial anistropic crystals discussed above, the present invention may also be embodied with biaxial anistropic crystals or with isotropic crystals which are characterized as either non-linear or linear. In such embodiments, a light beam incident upon the liquid coating on the entrance face passes through the liquid/solid boundary with relatively little surface damage (relative to an uncoated crystal) and then passes through a liquid coating on the exit face and through the region exterior to the crystal. In such embodiments, the effect of the liquid coating is to reduce the localized electric field in regions of the imperfections of the crystal surface, in a manner similar to that described above in conjunction with uniaxial crystals, and to thereby prevent electrical breakdown on the crystal with resultant surface damage. As a consequence, high power level incident beams may be applied to such linear crystals having coatings in accordance with the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. An optical device comprising, in combination:
   A. a passive crystal having an entrance face through which incident radiation propagates to the interior region of said crystal, an exit face through which light incident thereon from said interior region propagates to region exterior to said crystal, and an interior region characterized by at least two different principal indices of refraction, each of said principal indices of refraction differing from the index of refraction of the medium exterior to said crystal, and
   B. means for reducing the electric field near at least one of said faces induced by radiation incident on said face, said means including an optical flat adjacent to said face and a liquid coating between said optical flat and said face, said liquid coating being characterized by an index of refraction such that the magnitude of the difference between said index of refraction of said liquid coating and at least one of said principal indices of refraction is less than the magnitude of the difference between said index of refraction of said medium and any one of said principal indices of refraction.

2. An optical device according to claim 1 wherein said index of refraction of said liquid coating substantially matches one of principal indices of refraction of said crystal.

3. An optical device according to claim 1 wherein said crystal is composed of proustite ($Ag_3AsS_3$).

4. An optical device according to claim 3 wherein said liquid coating is selected from the group consisting of water, carbon disulfide and glycerine.

5. An optical device according to claim 1 wherein said interior region of said crystal is non-linear.

6. An optical device according to claim 5 wherein said crystal is uniaxial and sufficiently birefringent to allow phase matching such that two linearly and orthogonally polarized laser beams incident on said entrance surface with their respective polarization vectors forming predetermined angles with the optical axis of said crystal interact in said interior region to generate a resultant beam which propagates through said exit face, said resulting beam being characterized by a frequency equal to the difference between the frequencies of the respective incident laser beams.

7. An optical device according to claim 6 wherein said crystal is composed of proustite ($Ag_3AsS_3$).

8. An optical device according to claim 7 wherein said liquid coating is selected from the group consisting of water, carbon disulfide and glycerine.

9. An optical device comprising, in combination:
   A. a passive crystal having an entrance face through which incident radiation propagates to the interior region of said crystal, an exit face through which light incident thereon from said interior region propagates to region exterior to said crystal, and an interior region characterized by a single principal index of refraction, said principal index of refraction differing from the index of refraction of the medium exterior to said crystal, and
   B. means for reducing the electric field near at least one of said faces induced by radiation incident on said face, said means including an optical flat adjacent to said face and a liquid coating between said optical flat and said face, said liquid coating being characterized by an index of refraction such that the magnitude of the difference between said index of refraction of said liquid coating and said principal index of refraction is less than the magnitude of the difference between said index of refraction of said medium and said principal index of refraction.

10. An optical device according to claim 9 wherein said index of refraction of said liquid coating substantially matches principal index of refraction of said crystal.

* * * * *